United States Patent
Honzek et al.

(10) Patent No.: US 8,478,496 B2
(45) Date of Patent: Jul. 2, 2013

(54) TRANSMISSION SYNCHRONISATION METHOD AND DEVICE FOR AT LEAST TWO TRANSMISSIONS

(75) Inventors: Robert Honzek, Oberthingau (DE); Benno Pichlmaier, Munich (DE)

(73) Assignee: AGCO GmbH, Marktoberdorf (DE)

( * ) Notice: Subject to any disclaimer, the term of this patent is extended or adjusted under 35 U.S.C. 154(b) by 456 days.

(21) Appl. No.: 12/742,188

(22) PCT Filed: Oct. 24, 2008

(86) PCT No.: PCT/EP2008/009017
§ 371 (c)(1),
(2), (4) Date: May 10, 2010

(87) PCT Pub. No.: WO2009/059698
PCT Pub. Date: May 14, 2009

(65) Prior Publication Data
US 2010/0256881 A1    Oct. 7, 2010

(30) Foreign Application Priority Data
Nov. 8, 2007  (DE) .......................... 10 2007 053 320

(51) Int. Cl.
*G06F 19/00*    (2006.01)
(52) U.S. Cl.
USPC ........................................................ 701/58
(58) Field of Classification Search
USPC ........................................................ 701/58
See application file for complete search history.

(56) References Cited

U.S. PATENT DOCUMENTS

| | | |
|---|---|---|
| 4,976,332 A | 12/1990 | Hein |
| 5,147,010 A | 9/1992 | Olson |
| 7,172,046 B2 | 2/2007 | Ho |
| 2004/0200648 A1 | 10/2004 | Tarasinski et al. |
| 2011/0024222 A1* | 2/2011 | Honzek .................. 180/365 |

FOREIGN PATENT DOCUMENTS

| | | |
|---|---|---|
| GB | 2306420 | 5/1997 |

OTHER PUBLICATIONS

International Search Report from Application No. PCT/EP2008/009017 Dated Dec. 22, 2009.

* cited by examiner

*Primary Examiner* — Thomas Tarcza
*Assistant Examiner* — Maceeh Anwari

(57) ABSTRACT

The invention relates to a transmission synchronisation method and a transmission synchronisation device for at least two transmission units (T1, T2). The synchronisation takes place in that in each case an output revolution speed (n1, n2) of an axle drive shaft arranged in a transmission (T1, T2) is adjusted by means of a first and second adjustment unit (ADU1, ADU2). The synchronisation of the first and second transmissions (T1, T2) takes place by a result value (cal_out) of an arithmetic logic unit (140) being conducted to the second adjustment unit (ADU2) arranged at the second transmission (T2), dependent on the first transmission (T1) and on the reference value (v_set) of a preselection unit (100).

16 Claims, 3 Drawing Sheets

TRANSMISSION SYNCHRONISATION METHOD AND DEVICE FOR AT LEAST TWO TRANSMISSIONS

Figure 1:
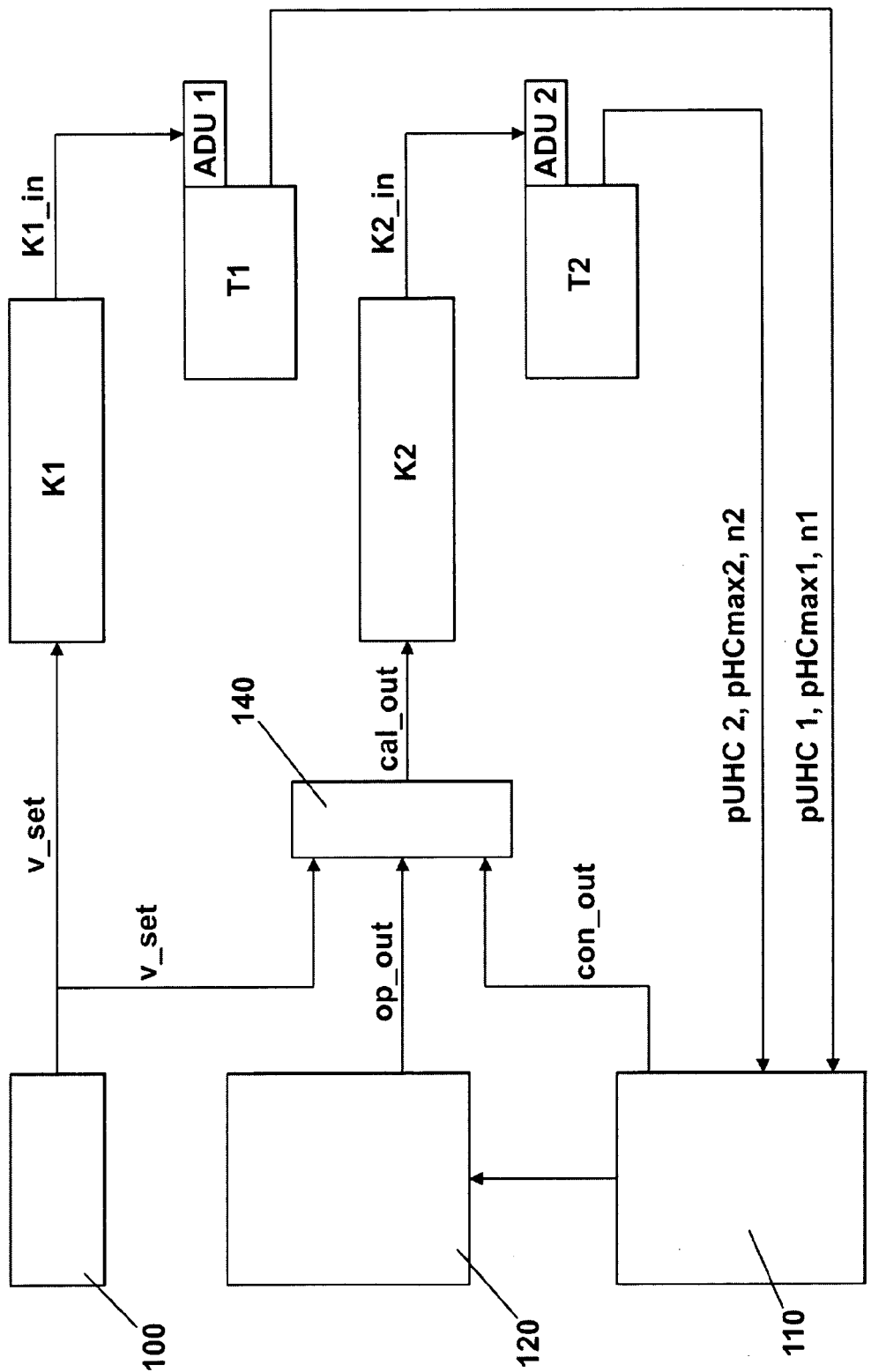

The invention relates to a transmission synchronisation method and a transmission synchronisation device for at least two transmissions of a utility vehicle.

For utility vehicles, in particular construction machines and agricultural vehicles, development is moving towards vehicles being constantly designed bigger. In this situation, however, for example with tractor units and agricultural tractors, the increasing of the drive capacity and the vehicle gross weight with the same requirements for ground pressure require a disproportionate growth in the contact surface areas. Moreover, the provision of sufficiently large contact surfaces is of relevance both in respect of minimisation of the slippage losses incurred between tyres and ground as well as with regard to the avoidance of excessive soil compaction.

By contrast, with conventional two-axle utility vehicles, utility vehicles with three driven axles offer larger contact surface areas in relation to two-axle units with comparable tyre fittings, such that the ground pressure exerted and slippage between the tyres and the ground are both reduced. Preferably, such three-axle utility vehicles have at least two transmissions, which are coupled in drive fashion to the axles. The use of two transmissions offers the advantage in comparison with the use of a single transmission that a single transmission must be designed in such a way that it would occupy too much structural space and would be uneconomical due to the high investment costs for development and tools, with low numbers of sales. In a utility vehicle with two transmissions, each of which is allocated to different axles and the transmission ratios of which can be adjusted independently of each other, synchronisation of the drive torques of both transmissions must be carried out in order to avoid damage to the transmissions.

The term "synchronisation of both transmissions" implies in this connection not only that both transmissions deliver the same torque, but that, depending on the operational circumstances such as differing ground conditions or when travelling round a bend, the torque values of the two transmissions can also be different.

Damage to the transmissions in the event of faulty synchronisation can therefore occur if, for example, a first transmission allocated to the front axle and/or to the middle axle is in push mode and a second transmission allocated to the rear axle is in pull mode. In this case, the respective transmissions will be acting against one another.

The object of the present invention consists of providing a transmission synchronisation method and/or a transmission synchronisation device, by means of which the synchronisation of at least two transmissions can be effected.

This object is resolved according to the invention by the features of Claims 1 and 12. Advantageous embodiments of the invention are characterised in the sub-claims.

The advantages achieved with the invention consist in particular of the fact that the synchronisation of the second transmission is based on the (input to output) revolution speed gear ratio of the first transmission. To achieve this, the input to output gear ratio of the second transmission is determined by a reference value being linked with a controlled variable, this being dependent, among other things, on the first transmission.

Accordingly, the torque of the second transmission can be adjusted as a function of the torque of the first transmission, and therefore synchronised with the first transmission. This also allows for a tyre slippage difference to be set between the first and second transmission with the aim of optimum utilisation.

Inasmuch as, for example, wheels with small wheel loadings are located at their operating point to the left of a maximum of a drive force-slippage curve, it is possible, by increasing the slippage, for the imposed drive torque of the allocated transmission to be increased likewise. This makes it possible for the momentary traction force of the vehicle as a whole to be increased and/or the transmission loading of this transmission unit to be matched to that of the other transmission unit with wheels allocated to it with greater wheel loadings. This also allows for a different operational state of the two transmissions to be prevented, such as, for example, the first transmission being operated in push mode and the second transmission being operated in pull mode at the same time.

The term "pull mode" is understood hereinafter to mean an operational state in which the vehicle is driven by a transmission unit. The term "push mode" designates the operational state in which, in an uninterrupted positive or adhesion engagement, the vehicle, including the transmission, is kept in a rotational movement by the vehicle itself. This can be the case, for example, with downhill travel.

Another advantage of the invention lies in the fact that, by means of an adjustment unit arranged at both the transmissions, it can be ensured that the same torque value is provided at both transmissions. In addition, however, by means of the adjustment unit arranged at the first and second transmissions, it is possible for the two transmissions to deliver different torque values. This non-uniform torque distribution is particularly useful in specific cases, such as when the utility vehicle is loaded at the rear or the head. A further advantage is that the torque provided by the transmissions can be divided between drive wheels and drive axles to suit particular requirements.

A further advantageous embodiment of the invention consists of the fact that, by means of a pilot control device, the different revolution speeds which are adjusted between the front axle and the rear axle when travelling round a bend, for example, can be taken into account in a pro-active manner with the aid of suitable sensors, such as by means of a steering angle sensor. Therefore the quality and stability of control is improved. The different revolution speeds between the front axle and the rear axle therefore result in a mean curve radius of the front axle that is greater than a mean curve radius of the rear axle. Moreover, the quality and stability of the control can be further improved in that additional parameters can be taken into account in the pilot control unit which have an influence on the synchronisation of the transmissions.

An advantageous further embodiment of the invention also consists of the fact that a restriction pertains in respect of the maximum permissible output revolution speed difference between the first and second transmissions. Accordingly, the two transmissions are prevented from changing the respective revolution speed gear ratios any further if, for example, the torque values specified in each case are not attained.

The risk can therefore be avoided that, in the event of different ground conditions, such as when the front axle is on tar and the rear axle is on ice, the revolution speed of the rear axle is increased in order to achieve a higher torque. However, because of the ground conditions this is only possible with a sharp rise in revolution speed, and may even not be possible at all, and is associated with the disadvantage that if the rear axle comes in contact with tar, for example, the torque will be increased abruptly and a sudden loading peak will be exerted on the drive train.

A further advantageous embodiment of the invention also lies in the fact that, with an output revolution speed setting based on pressure regulation, the pressure occurring in the hydraulic section of the transmissions, which is dependent on the drive torque, can be kept constant as specified in order to distribute stresses equally. In addition, the disturbance variables arising in the control circuit can be compensated for by this pressure regulation in relation to the revolution speed setting.

Details of the invention are explained in greater detail on the basis of the drawings. These show:

FIG. 1: A principle sketch representing the transmission synchronisation method, FIG. 2: A principle sketch of an adjustment unit and of a hydraulic power branch of a transmission unit, and FIG. 3: A principle sketch of a multi-axle utility vehicle.

FIG. 1 shows a principle sketch which shows the transmission synchronisation method. In this situation, by means of a preselection unit 100, a reference value such as a drive torque value of a utility vehicle or a utility vehicle speed can be preselected. Also represented in this embodiment are two transmissions T1, T2, which can be infinitely variable hydrostatic-mechanical output-branched transmissions. The output from these types of transmissions can in this situation be adjusted in each case by a corresponding actuation of a hydrostatic output branch.

To do this, a first transmission T1 has a first adjustment unit ADU1 and a second transmission T2 has a second adjustment unit ADU2. In each case, too, measuring units, not shown in FIG. 1, are arranged in the first and second adjustment units ADU1, ADU2.

By means of the preselection unit 100, in this case a vehicle speed v_set is to be specified as a reference value. This reference value v_set is converted by means of a first characteristic map K1 into an input value K1_in for the first adjustment unit ADU1. By means of this input value K1_in, the adjustment unit ADU1 of the first transmission T1 can adjust a first revolution speed n1 (not represented in FIG. 1) of a drive axle shaft extending from the output of transmission T1. In addition, by means of measuring units arranged inside the first transmission T1, the first revolution speed n1 of the axle drive shaft and several pressure values pUHC1, pHCmax1 of a hydraulic output branch of the first transmission T1 are determined.

The reference value v_set is not communicated directly to the second transmission T2, but is mathematically linked to at least one value described hereafter. Accordingly, a result value cal_out from the mathematical link is conducted to a second characteristic map K2 in an arithmetic logic unit 140. By means of the second characteristic map K2 an input value K2_in is determined for a second adjustment unit ADU2 of the second transmission T2. The second adjustment unit ADU2 of the second transmission T2 can therefore adjust and set a second revolution speed n2 of an emerging axle drive shaft, not shown in FIG. 1.

In addition, by means of measuring units arranged inside the second transmission T2, the second revolution speed n2 of the axle drive shaft and several pressure values pUHC2, pHCmax2 of the hydraulic output branch of the second transmission T2 are determined.

The values determined by the measuring units (not shown) of the first and second adjustment units ADU1, ADU2 are communicated to a control unit 110. The control unit 110 can, for example, be a Proportional-Integral-Derivative (PID) controller. The output value con_out of the PID controller corresponds to an input value of the arithmetic logic unit 140.

The control unit 110 is intended in this situation to compensate for disturbance variables caused by a variance in slippage between two axles for example. This is done by changing the input to output revolution speed transmission ratio of the individual transmission units, In addition, the vehicle speed v_set specified from the preselection unit 100 is conducted to the arithmetic logic unit 140. In the arithmetic logic unit 140 these two values are, for example, added and the result value cal_out from the calculation is conducted to the second characteristic map K2.

In addition, for example, account can be taken of the influence on the synchronisation of the two transmissions of unequal revolution speeds of the wheels or axles allocated to the transmissions when travelling around bends and/or with tyre pressure and/or a wheel load and/or suspension deviation. This is done by a pilot control unit 120 which generates an operational value op_out. The operational value op_out is communicated to the arithmetic logic unit 140 as an input value, in addition to the vehicle speed v_set and the controlled variable con_out of the arithmetic logic unit 140.

Moreover, the pilot control unit 120 can also be designed in such a way that the output value op_out is adapted to the values of the first and second transmissions T1, T2, as determined by the measuring units in such a way that a continuous optimisation of the pilot control in the sense of reducing the burden of controlling is achieved. Therefore, in the ideal case, the controlled variable con_out becomes essentially zero.

Figure 2:
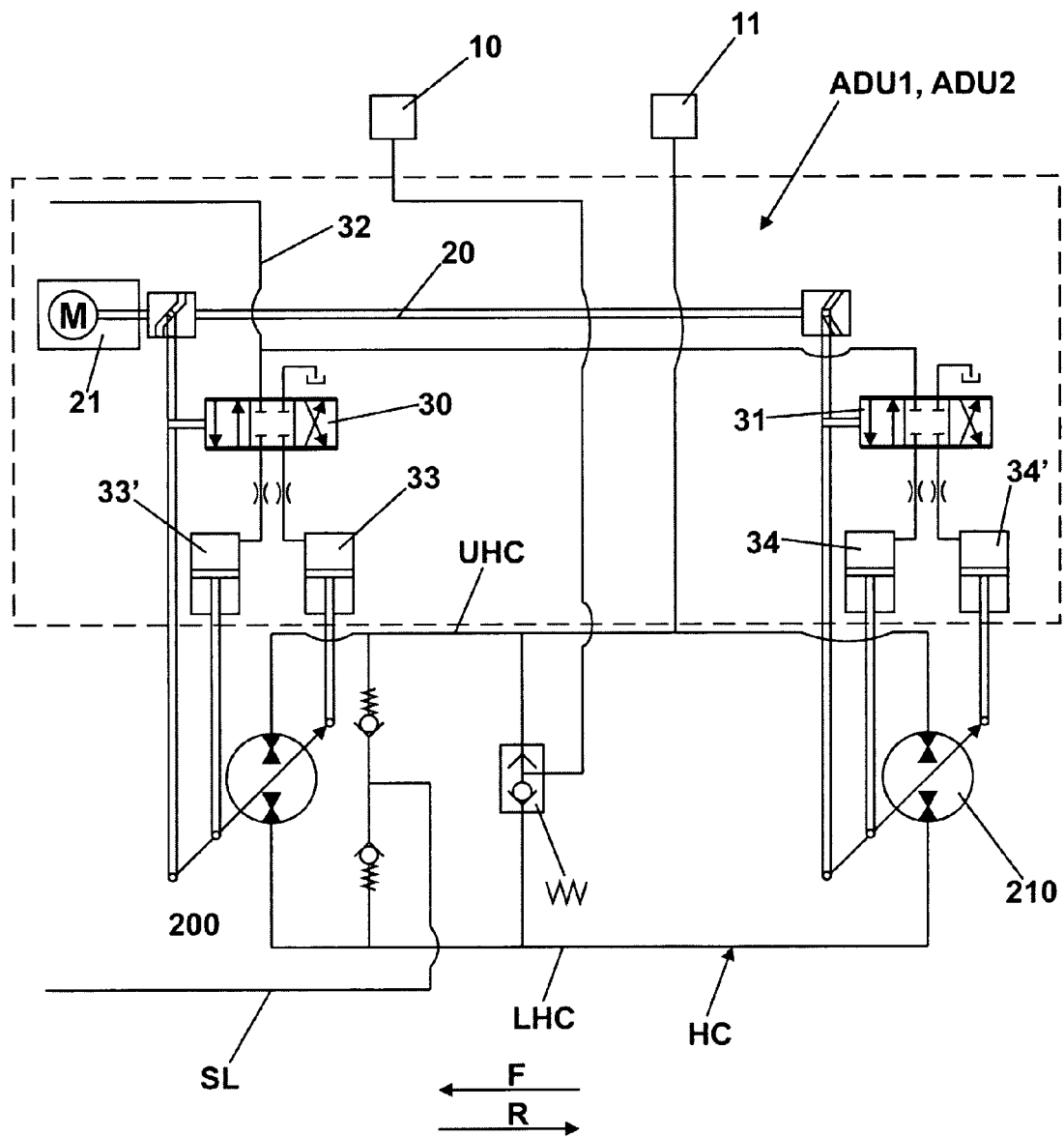

FIG. 2 shows a principle sketch of an adjustment unit ADU1, ADU2 and a hydraulic power unit of a transmission T1, T2. In this situation, the components belonging to the adjustment unit ADU1, ADU2 are located inside the rectangle defined by the broken line, and the components belonging to the transmissions T1, T2 are located outside the rectangle defined by the broken line.

The hydraulic power unit of the transmission T1, T2 has in each case hydrostats 200, 210, wherein hereafter the hydrostat 200 is designated as the hydraulic pump 200 and the hydrostat 210 as the hydraulic motor 210. The hydrostats 200, 210 illustrated in FIG. 2 are axial piston machines of oblique-axle design, of which the delivery/intake volume is changed by the pivoting of the axis of rotation of the pistons to an axle drive shaft, not shown.

By means of a first valve unit 30 allocated to a hydraulic pump 200, and by means of a second valve unit 31 allocated to the hydraulic motor 210, the individual pivot angle of the hydraulic pump 200 and/or of the hydraulic motor 210 can be adjusted.

In this situation, depending on the specified revolution speed transmission ratio, an actuator element 20 is rotated by means of an actuator motor 21. The actuator motor 21 is in this case controlled by a control device, not shown in FIG. 2. Because the valve units 30, 31 are coupled to the actuator element 20, these valve units 30, 31 are displaced corresponding to the actuator element 20. As a result, oil present in a line 32 can flow into a cylinder 33, 33', 34, 34' allocated to the valve unit 30, 31.

Due to the displacement of the actuator element 20, the oil flow is accordingly directed out of the line 32 into the cylinders 33, 33', 34, 34' and with it the pivot angle of the hydraulic pump 200 and of the hydraulic motor 210 is adjusted. The pivot angle, and therefore the delivery volume of the hydraulic pump 200 and the intake volume of the hydraulic motor 210 can accordingly be changed. This makes it possible for the revolution speed of the axle drive shaft, not shown in FIG. 2, to be adjusted, and with it the revolution speed transmission ratio of the individual transmission T1, T2.

In addition, the hydraulic pump 200 is connected by fluid means to the hydraulic motor 210 by means of a fluid circuit HC. The fluid circuit HC in this situation has an upper circuit UHC and a lower circuit LHC. In this situation, the direction of the arrow F represents a flow direction of the fluid located inside the hydraulic circuit HC during forwards travel of the utility vehicle and the direction of the arrow R represents a flow direction of the fluid during reverse travel of the utility vehicle.

By means of a first measuring unit 11, the pressure value pUHC1, pUHC2 prevailing in the upper circuit UHC can be measured. This pressure value pUHC1, pUHC2 is then sent to the control unit 110 represented in FIG. 1. Moreover, both the pressure in the upper circuit UHC as well as the lower circuit LHC are conducted by means of a changeover valve WV to a second measuring unit 10 in order to measure the pressure value pHCmax1, pHCmax2.

In this situation, the changeover valve WV in the individual transmission T1, T2 is designed in such a way so as to communicate to the second measuring unit 10 the greater of the two pressures present in the upper circuit UHC or of the lower circuit LHC as a pressure value pHCmax1, pHCmax2. When the utility vehicle is stationary, the second measuring unit 10 issues a system pressure arising in the upper circuit UHC or the lower circuit LHC as pressure value pHCmax1, pHCmax2.

A rotation sensor, not visible in FIG. 2, is arranged at the hydraulic motor 210, with which the direction of the rotation of the hydraulic motor 210 is determined and the direction of travel of the vehicle can be concluded.

Preferably, when the vehicle is stationary a system pressure of about 15 bar is set in the fluid circuit HC. This system pressure of 15 bar results from the fact that, by means of a supply line SL, the fluid circuit HC is supplied with a constant system pressure by means of a constant hydraulic pump, not shown, driven by the combustion engine. As soon as the utility vehicle moves or the transmission is no longer stationary, the pressure inside the fluid circuit rises, depending on the drive torque, to a high-pressure value of over 15 bar. With an average loading of the transmission, a high-pressure value of 250-350 bar is provided. A limit value of 500 bar must not be exceeded, however, since otherwise overstressing of the transmission and its components is to be expected.

Due to the pressure prevailing in the fluid circuit HC, the torque of the drive shaft leaving the hydraulic motor 210 is determined and therefore the traction force of the individual transmission unit T1, T2.

In this situation, the first measuring unit 11 serves to identify the presence of a push operation or a pull operation of the utility vehicle and therefore of the transmission unit T1, T2. The term "pull operation" is understood hereinafter to mean an operational state in which the vehicle is driven by a transmission unit. The term "push operation" designates the operational state in which, in an uninterrupted positive or adhesion engagement, the vehicle, including the transmission, is kept in a rotational movement by the vehicle itself. This can be the case, for example, with downhill travel.

The detection of forwards travel or reverse travel of the utility vehicle, and therefore the direction of rotation of the transmission, can be carried out by the rotation sensor, not shown in FIG. 2. In this situation, the direction of rotation of the hydraulic motor 210 is detected by the rotation sensor. The individual directions of rotation of the hydraulic motor 210 during forward or reverse travel of the utility vehicle are in each case opposed to one another. Hereinafter, by way of example, the forward travel of the utility vehicle is considered by taking account of the combination of both transmissions T1, T2. In this situation, a pulling operation of a transmission T1, T2, and therefore also of the utility vehicle during forward travel, creates a high pressure in the upper circuit UHC which is measured by the first measuring unit 11. The high pressure measured is greater than a system pressure with the utility vehicle at rest.

By means of the hydraulic motor 210, the hydraulic output created by the hydraulic pump 200 is converted into a mechanical output. Consequently, in the lower circuit LHC, which with forward movement of the vehicle corresponds to the hydraulic range which forms in the direction of flow between the hydraulic motor 210 and hydraulic pump 200, the system pressure of around 15 bar pertains. At reverse movement of the utility vehicle in pulling mode, by contrast, the system pressure pertains in the upper circuit UHC and the high pressure in the lower circuit LHC.

A push operation of a transmission T1, T2, and therefore also of the utility vehicle in forward movement, can be detected by the fact that in this case one or both hydraulic motors 210 of the individual transmission T1, T2 is or are driven by the utility vehicle itself. Consequently, the pressure in the lower circuit LHC rises to the high pressure and is measured by the second measuring unit 10. Moreover, with the utility vehicle in push mode no hydraulic output is created by the hydraulic pump 200. Rather, the hydraulic output produced by the hydraulic motor 210 is converted by the hydraulic pump 200 into a mechanical output. Consequently, the system pressure now pertains in the upper circuit UHC, which is measured by the first measuring unit 11. With the utility vehicle in reverse travel in push mode, by contrast, the high pressure pertains in the upper circuit UHC and the system pressure in the lower circuit LHC.

Figure 3:
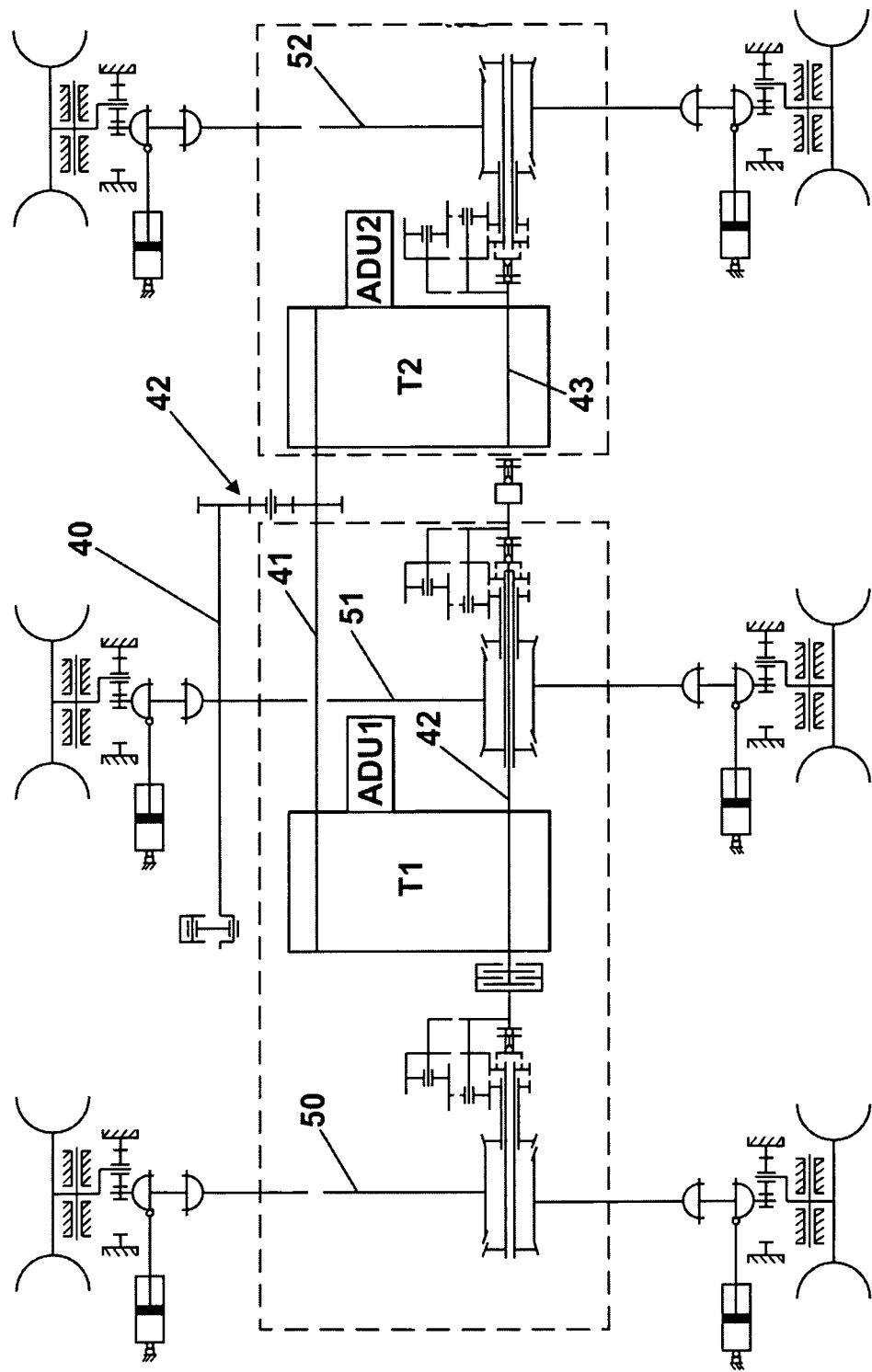

FIG. 3 shows a principle diagram of a multi-axle utility vehicle. In this embodiment this is a utility vehicle with a front axle 50, a middle axle 51 and a rear axle 52. In addition, the utility vehicle has two transmissions T1, T2, which are coupled by means of axle drive shafts 42, 43 to the individual axles 50, 51, 52.

By means of a jointed shaft 40 and a distribution transmission 42, the drive torque from a combustion engine is transferred onto a drive shaft 41. In this situation, the drive shaft 41 is coupled both to the first as well as to the second transmission T1, T2. By means of the individual adjustment unit ADU, the revolution speed of the axle drive shafts 42, 43 and therefore the revolution speed of the individual axle 50, 51, 52 can be adjusted. In this situation, in this embodiment, the first transmission T1 is coupled, for example, via the first axle drive shaft 42 to the front axle and the middle axle. The second transmission T2 is further coupled via the second axle drive shaft 43 to the rear axle 52.

It is clear to the person skilled in the art that departures from this embodiment are possible without departing from the scope of protection of the invention. Thus, it is possible, for example, with the aid of the transmission synchronisation method according to the invention and/or a transmission synchronisation device according to the invention to allocate at least two transmissions not to more than one axle, but rather to more than one wheel.

Although the utility vehicle described above with reference to FIG. 3 comprises three driven axles, it will be appreciated that the described transmission synchronisation method and device could be implemented on a utility vehicle having two, or even four, driven axles without deviating from the scope of the invention.

The invention claimed is:

1. A method of synchronizing a first transmissions and a second transmission, said method comprising the steps of:

conducting a reference value (v_set) as an input value to a first adjustment unit (ADU1) of the first transmission (T1);

adjusting the first transmission (T1) with the first adjustment unit (ADU1) to the reference value (v set);

determining a controlled variable (con_out) from at least one first output value (pUHC1, n1, pHCmax1) of the first transmission (T1) and at least one second output value (pUHC2, n2, pHCmax2) of the second transmission (T2);

mathematically linking the controlled variable (con_out) to the reference value (v_set);

inputting a result value (cal_out) to a second adjustment unit (ADU2) of the second transmission (T2); and adjusting the second transmission (T2) with the second adjustment unit (ADU2) to the result value (cal_out).

2. The method of claim 1 further comprising the step of mathematically linking the controlled variable (con_out) to the reference value (v_set) and an operational value (op_out).

3. The method of claim 2 wherein the operational value (op_out) is at least one of the following:
   a steering angle,
   an all-wheel drive state,
   a tire pressure, and
   a wheel loading.

4. The method of claim 2 further comprising the step of adapting the operational value (op_out) as a function of at least one of the controlled variable (con_out) and the output value (pUHC1, n1, pHCmax1, pUHC2, n2, pHCmax2) of one of said transmissions (T1, T2).

5. The method of claim 1 wherein the individual output values of the first and second transmissions (T1, T2) are at least one of the following: a revolution speed (n1, n2), a pressure value (pUHC1, pUHC2) measured by a first measuring unit 11, and a pressure value (pHCmax1, pHCmax2) measured by a second measuring unit 10.

6. The method of claim 1 wherein the first and second transmissions comprise a hydrostatic pump (200) and motor (210) arranged in a hydraulic circuit (HC) and deliver a continuously variable output.

7. The method of claim 6 wherein a pull operation pertains when the hydraulic pressure upstream from the pump (200) is less than the pressure downstream and a push operation pertains when the hydraulic pressure upstream from the pump (200) is greater than the pressure downstream.

8. The method of claim 1 wherein the direction of travel of a utility vehicle is detected by a determination of a direction of rotation of a hydraulic motor (210).

9. The method of claim 1 wherein the first transmission (T1) is set to the reference value (v_set) and the adjustment of the second transmission (T2) to the result value (cal_out) by means of a pressure regulation of the high pressure in the transmission (T1, T2).

10. The method of claim 1 wherein the input value of the first transmission (T1) is a reference characteristic map value (K1_in), dependent on the reference value (v_set), of a first characteristic map (K1) and the input value of the second transmission (T2) is a result characteristic map value (K2_in) of a second characteristic map (K2) dependent on the result value (cal_out).

11. The method of claim 1 wherein an output revolution speed difference (n1, n2) between the first transmission (T1) and the second transmission (T2) is limited.

12. A transmission synchronization device comprising:
   a first transmission and a second transmission (T1, T2), each transmission having an adjustment unit (ADU1, ADU2),
   an arithmetic logic unit (140), a preselection unit (100), and in each case with measuring units arranged in the transmissions (T1, T2), and with
   a control unit (110) which receives output values (n1, n2, pUHC1, pUHC2, pHCmax1, pHCmax2) determined by the measuring units,
   a reference value (v_set) from the preselection unit (100) conducted to the first transmission (T1), and the result value conducted to the second transmission (T2) calculated from the reference value (v_set) and from a controlled variable (con_out) determined by the control unit (110).

13. The transmission synchronization device of claim 12 wherein the result value (cal_out) is calculated from the reference value (v_set), from the controlled variable (con_out) determined by the control unit (110), and from an operational value of a pilot control unit (120).

14. The transmission synchronization device of claim 12 wherein at least one of the transmissions (T1,T2) has a hydraulic pump (200) and a hydraulic motor (210), which are fluidically connected to one another, wherein the hydraulic pump (200) and the hydraulic motor (210) is coupled to an actuator element (20).

15. The transmission synchronization device of claim 12 at least one of the transmissions (T1, T2) is designed as an infinitely variable speed transmission with hydrostatic-mechanical output branching.

16. The transmission synchronization device of claim 12 in a utility vehicle comprising three driven axles, wherein first and second axles (50, 51) of said driven axles are driven by the first transmission (T1) and wherein the third axle (52) is driven by the second transmission (T2).

* * * * *